(12) United States Patent
Humlicek (10) Patent No.: US 6,591,264 B1
(45) Date of Patent: Jul. 8, 2003

(54) METHOD THAT ALLOWS I/O REQUESTS TO RUN CONCURRENTLY WITH A ROLLBACK FROM A SNAPSHOT IN A DRIVE ARRAY (75) Inventor: Donald R. Humlicek, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 174 days.

(21) Appl. No.: 09/694,534

(22) Filed: Oct. 23, 2000

(51) Int. Cl.[7] .............................................. G06F 17/30
(52) U.S. Cl. ............................. 707/8; 707/202; 707/203
(58) Field of Search ............................ 707/8, 200, 201, 707/202, 203, 204

(56) References Cited

U.S. PATENT DOCUMENTS

| | | | | |
|---|---|---|---|---|
| 5,317,731 A | * | 5/1994 | Dias et al. | 707/202 |
| 5,487,160 A | * | 1/1996 | Bemis | 711/114 |
| 5,574,851 A | * | 11/1996 | Rathunde | 711/114 |
| 5,680,580 A | * | 10/1997 | Beardsley et al. | 710/38 |
| 6,457,098 B1 | * | 9/2002 | DeKoning et al. | 711/114 |

* cited by examiner

*Primary Examiner*—Sanjiv Shah
(74) *Attorney, Agent, or Firm*—Christopher P. Maiorana, PC (57) ABSTRACT

A method for allowing I/O requests to run concurrently during a rollback process, comprising the steps of (A) reading from and writing to an original volume and (B) running said I/O requests concurrently with the rollback process from a snapshot volume.

20 Claims, 6 Drawing Sheets

METHOD THAT ALLOWS I/O REQUESTS TO RUN CONCURRENTLY WITH A ROLLBACK FROM A SNAPSHOT IN A DRIVE ARRAY

FIELD OF THE INVENTION

The present invention relates to a method and/or architecture for improving efficiency in a rollback process generally and, more particularly, to a method and/or architecture for implementing I/O requests concurrently with a rollback process.

BACKGROUND OF THE INVENTION

Conventional technology exists for quickly creating a snapshot (i.e., a point-in-time) image of a volume. At the time the snapshot is taken, a new volume is made available that can be used to access the point-in-time image of the original volume while the original volume can continue to be modified. The original volume is temporarily unavailable when the snapshot is established. When the original volume is being modified, a copy of the original data is temporarily saved in a separate repository volume. The method is typically referred to as a copy-on-write mechanism.

Conventional technology also permits the contents of the original volume to be "rolled back" to the time that the snapshot was taken. Such a rollback process involves copying data that was saved in the repository volume back to the original volume. However, the rollback process can consume a considerable amount of time depending on the amount of data that has been changed since the time the snapshot was taken.

Conventional rollback mechanisms have limitations in that the original volume is unavailable (offline) during the rollback process. Additionally, since the original volume is offline, new snapshots cannot be made until the rollback process is complete.

SUMMARY OF THE INVENTION

The present invention concerns a method for allowing I/O requests to run concurrently during a rollback process, comprising the steps of (A) reading from and writing to an original volume and (B) allowing the I/O requests to run concurrently during the rollback process from a snapshot volume.

Another aspect of the present invention concerns an apparatus configured to read and write data to an original volume. The apparatus may be configured to run concurrently during a rollback process of the original volume from a second volume.

The objects, features and advantages of the present invention include providing method and/or apparatus that allows I/O requests to run concurrently with a rollback from a snapshot in a drive or drive array that may (i) allow efficient implementation of a snapshot (e.g., point-in-time) image of a volume; (ii) allow full availability of the original volume during a rollback process; and/or (iii) allow new snapshots to be taken of the volume at any point during the rollback process.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
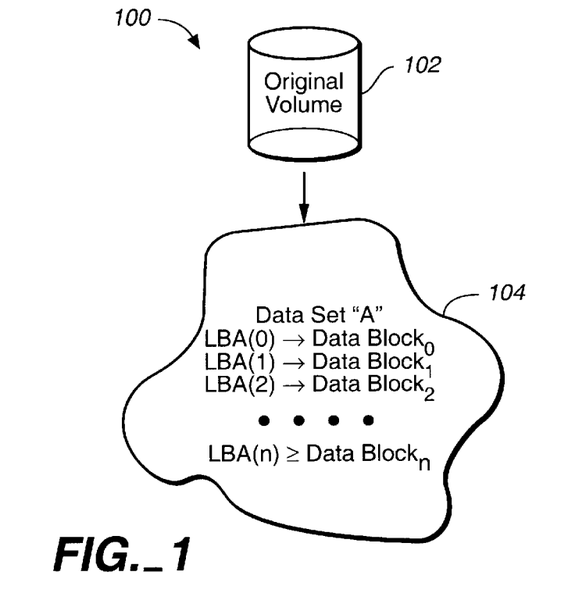
FIG. 1 is a block diagram of a preferred embodiment of the present invention.

Referring to FIG. 1, a block diagram of a circuit (or system) 100 is shown in accordance with a preferred embodiment of the present invention. The system 100 generally comprises a volume block (or circuit) 102 and a logic block (or circuit) 104. The system 100 may allow efficient implementation of a snapshot (e.g., point-in-time) image of a volume. The system 100 generally allows full availability of the original volume 102 during a rollback process. Furthermore, the system 100 allows new snapshots to be taken of the volume 102 at any point during the rollback process.

The logic 104 may comprise a number of logical block addresses (LBAs). The LBAs may comprise a data set "A". The original volume 102 may contain a set of data blocks that may be mapped (via the logic 104) to a set of logical block addresses. The LBAs may be one-to-one mapped to the data blocks. For example, a particular LBA may point to a particular data block. Such an implementation is generally typical of disk drives and volumes on disk arrays. The system 100 may illustrate a simple association between the original volume 102 and the data set A of the logic block 104.

Figure 2:
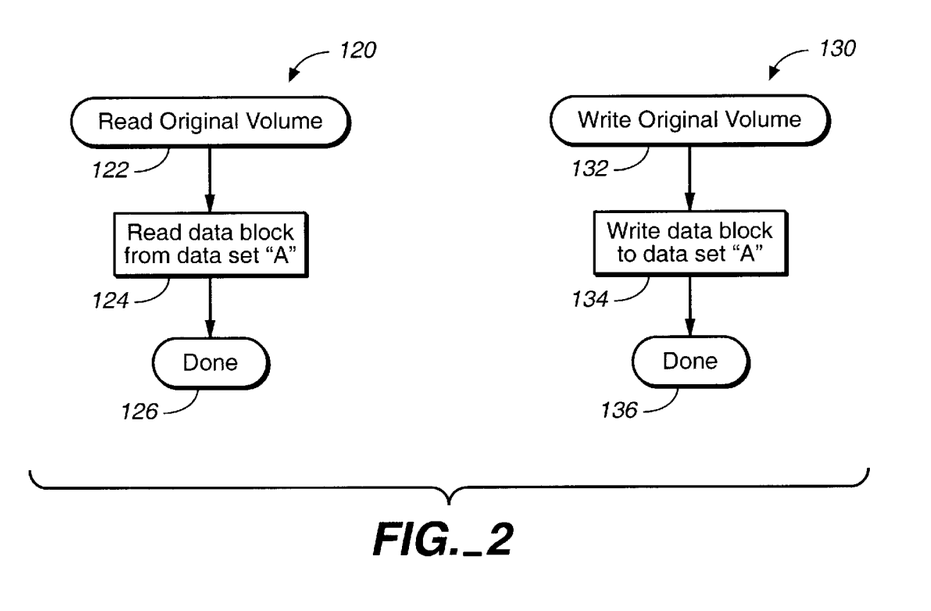
FIG. 2 is a block diagram illustrating read and write operations of the present invention.

Referring to FIG. 2, an illustration of a read operation 120 and a write operation 130 is shown. The operations 120 and 130 may illustrate how reads and writes to the original volume 102 are handled when a snapshot is not active and a rollback is not active. The read operation 120 generally comprises a state 122, a state 124 and a state 126. The state 122 generally reads the original volume. The state 124 generally reads one or more data block(s) from the data set A. The state 126 is generally a DONE state that completes the read operation. Similarly, the write operation 130 generally comprises a state 132, a state 134 and a state 136. The state 132 generally writes information to the original volume 102. The state 134 generally writes one or more data block(s) to the data set A. The state 136 is generally a DONE state that completes the write operation.

Figure 3:
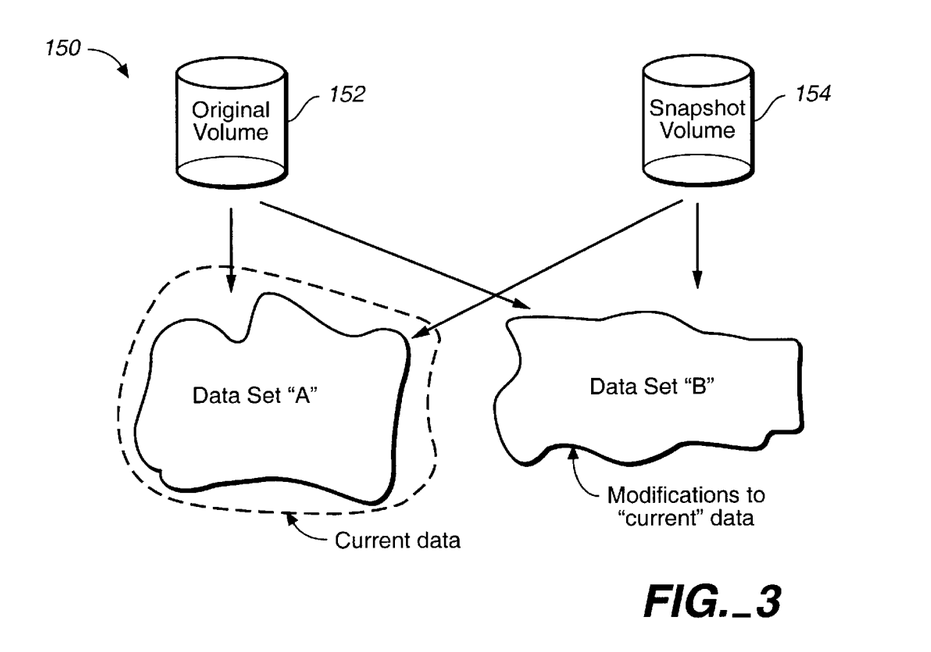
FIG. 3 is a block diagram illustrating an operation of the present invention.

Referring to FIG. 3, a diagram of an operation 150 illustrating a new association between the original volume 152 and snapshot volume 154 with the data set A and a data set "B". The operation 150 generally comprises an original volume 152, a snapshot volume 154, a data set A and a data set B. The data set A may represent current data. The data set B may represent modifications to the current data of data set A. When a snapshot is taken of the original volume, a new volume may be made available to access the point-in-time image of the original volume. The new volume generally comprises two different data sets (i) the data set A and (ii) the data set B. The data set A and the data set B may contain a set of data blocks that are mapped to a set of LBAs. The data set B may be created empty (e.g., without data), and may be similar to the data set A. Subsequently, the data set B may contain data blocks that were modified in the data set A. The snapshot may be accessed via the current data within the data set A. Additionally, the data set A may comprise current data when a rollback is active.

Figure 4:
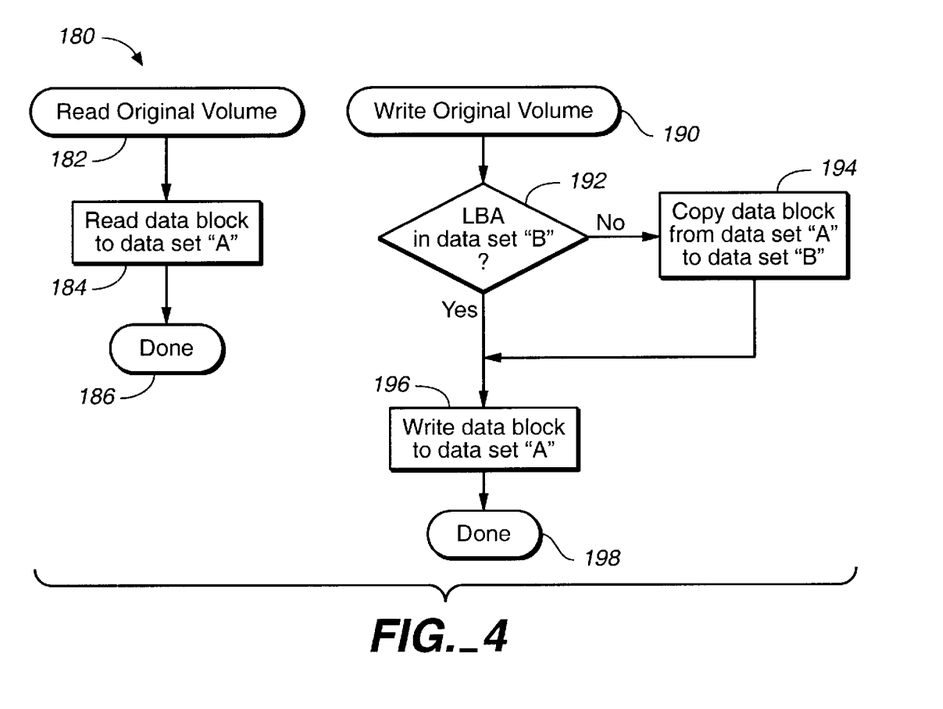
FIG. 4 is a block diagram illustrating read and write operations of the present invention.

Referring to FIG. 4, an operation 180 is shown illustrating how reads and/or writes are handled when a snapshot image is active and the rollback process is not. The operation 180 generally comprises a read portion comprising a state 182, a state 184 and a state 186. A write portion generally comprises a state 190, a decision state 192, a state 194, a state 196 and a state 198. The state 182 may read data from the original volume. The state 184 may read one or more-data blocks from the data set A. The state 186 may be a DONE state. The states 182, 184 and 186 are generally similar to the states 122, 124 and 126 of FIG. 2. The state 190 generally writes to the original volume 102. The decision state 192 generally determines if a logical block address is present in the data set B. If the LBA is present, the state 196 may write one or more data blocks to the data set A. If the LBA is not present, the state 194 may copy one or more data blocks from the data set A to the data set B and then proceed to the state 196 to write data to the data set A. The state 198 is generally a DONE state.

Figure 5:
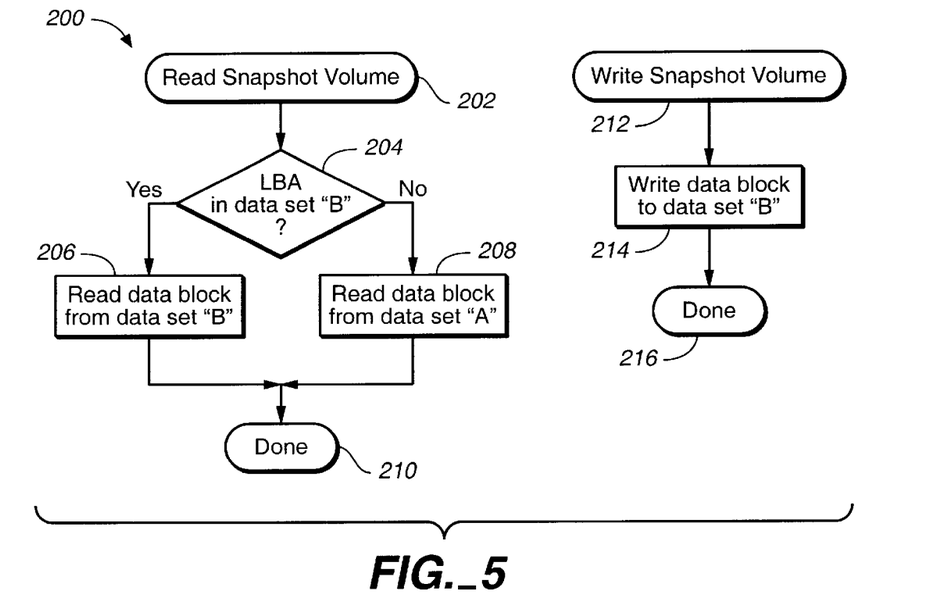
FIG. 5 is a block diagram illustrating read and write operations of the present invention.

Referring to FIG. 5, an operation 200 is shown illustrating how reads and writes to the snapshot volume are handled when the snapshot image is active and the rollback process is not active. The operation 200 generally comprises a state 202, a state 204, a state 206, a state 208, a state 210, a state 212, a state 214 and a state 216. The states 212, 214 and 216 may be similar to the states 132, 134 and 136 of FIG. 2. The state 202 generally reads a snapshot volume. The state 204 generally determines if a logical block address (LBA) is present in the data set B. If the LBA is present, the state 206 generally reads data from the data set B. If the LBA is not present, the state 208 generally reads one or more data blocks from the data set A. The states 206 and 208 both proceed to the DONE state 210.

Figure 6:
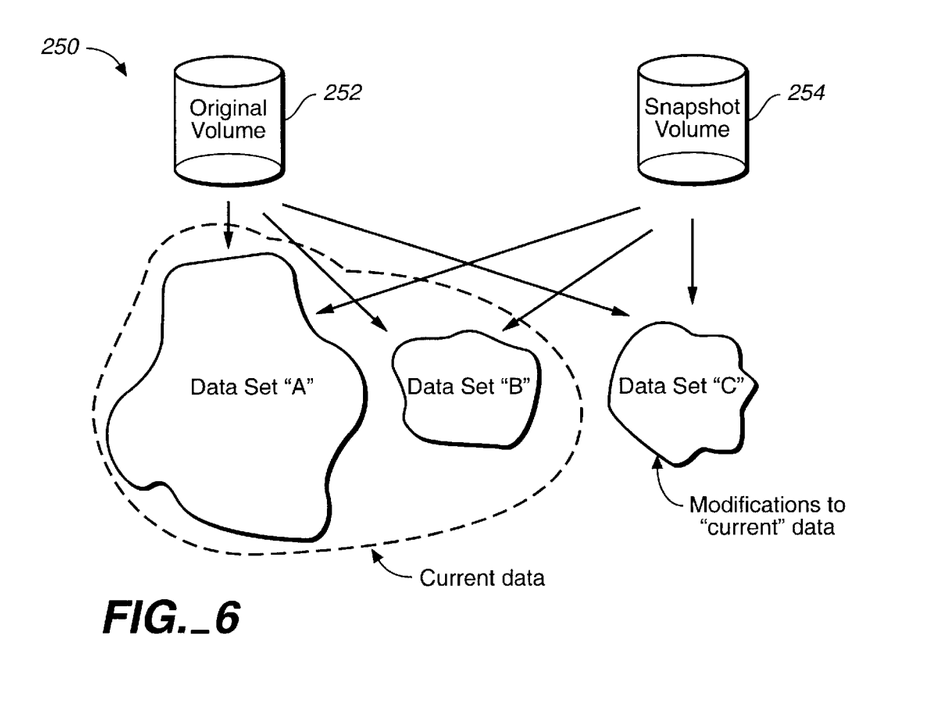
FIG. 6 is a block diagram illustrating an operation of the present invention.

Referring to FIG. 6, an operation 250 is shown. The operation 250 generally comprises an original volume 252, a snapshot volume 254, the data set A, the data set B and a data set "C". The operation 250 may illustrate a new association between the original volume 252 and the snapshot volume 254 during a rollback process with data sets A, B, and C. During the rollback process, data blocks may be copied from the data set B back to the data set A by ascending LBAs. In order to allow I/O requests to continue to the original volume 252 during the rollback process, a new data set (e.g., the data set C) is created. The original volume 252 and the snapshot volume 254 are generally aware of all three data sets and the rollback process may implement the data sets to handle the I/O operations. The data sets A and B may comprise current data. The data set C may comprise modifications to the current data.

Figure 7:
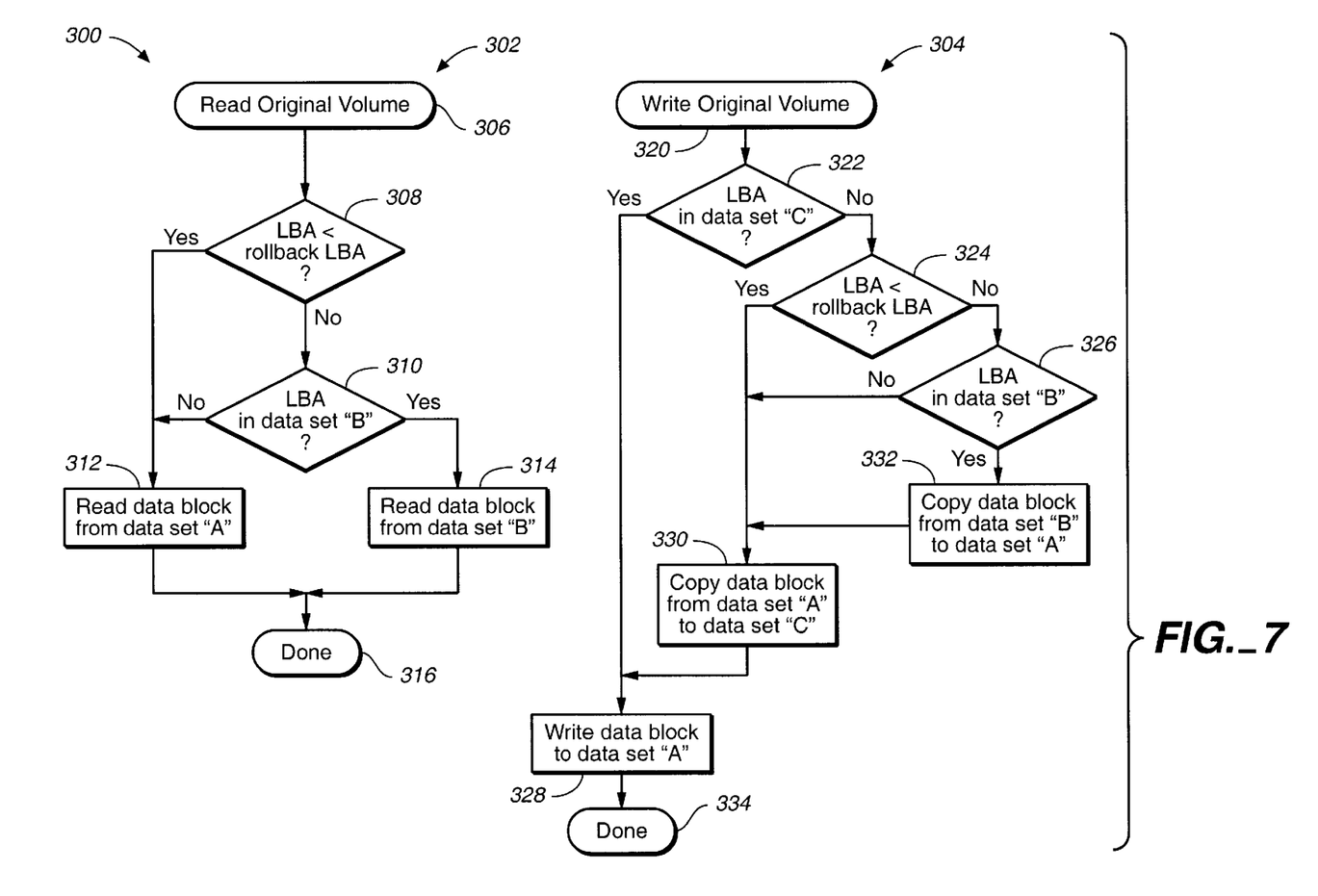
FIG. 7 is a block diagram illustrating read and write operations of the present invention.

Referring to FIG. 7, an operation 300 is shown illustrating how reads and writes to the original volume are handled when the snapshot image is active and the rollback process is active. However, a write operation may perform a rollback on a particular LBA when the rollback process is active, but has not yet reached the LBA. The operation 300 generally comprises a read portion 302 and a write portion 304. The read portion 302 generally comprises the state 306, a decision state 308, a decision state 310, a state 312, a state 314 and a state 316. The state 306 generally reads data from the original volume 102. The decision state 308 may determine if a logical block address is less than the rollback logical block address. If the LBA is less than the rollback LBA, the state 312 may read one or more data blocks from the data set A and proceed to the DONE state 316. If the LBA is not less than the rollback LBA, the decision state 310 may determine if the LBA is in the data set B. If the LBA is in the data set B, the state 314 may read one or more data blocks from the data set B and proceed to the DONE state 316. If the LBA is not in the data set B, the state 312 may read one or more data blocks from the data set A and proceed to the DONE state 316.

The write portion 304 generally comprises a state 320, a decision state 322, a decision state 324, a decision state 326, a state 328, a state 330, a state 332 and a state 334. The state 320 may write data to the original volume 102. The decision state 322 may determine if an LBA is present in the data set C. If the LBA is present in the data set C, the state 328 may write one or more data blocks to the data set A and proceed to the DONE state 334. If the LBA is not in the data set C, the decision state 324 may determine if the LBA is less than the rollback LBA. If the LBA is less than the rollback LBA, the state 330 may copy one or more data blocks from the data set A to the data set C and proceed to the state 328. If the LBA is not less than the rollback LBA, the decision state 326 may determine if the LBA is in the data set B. If the LBA is in the data set B, the state 332 may copy one or more data blocks from the data set B to the data set A and proceed to a state 330. If the LBA is not in a data set B, the decision state 326 may proceed to the state 330. The state 330 may copy one or more data blocks from the data set A to the data set C and then proceed to the state 328.

Figure 8:
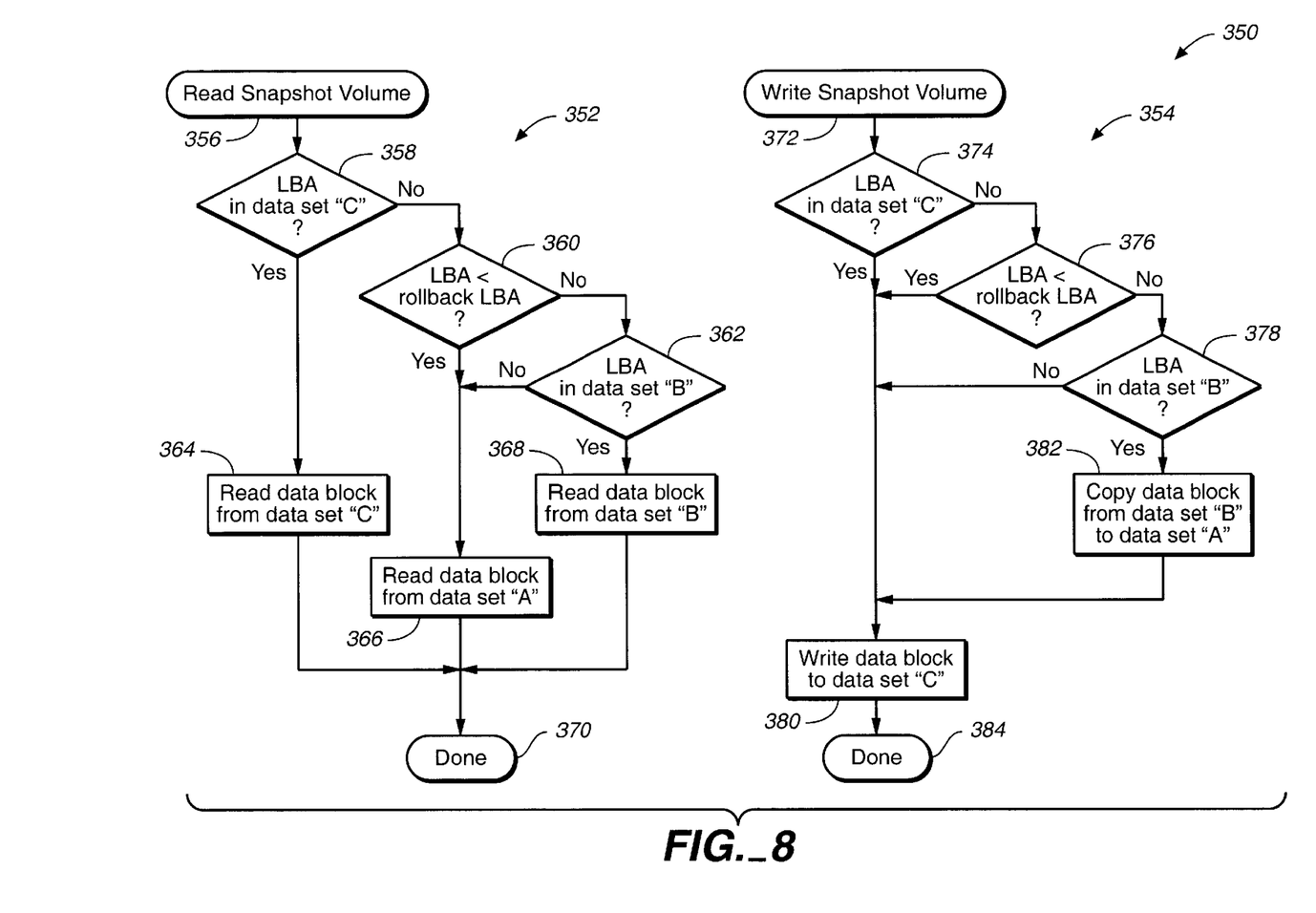
FIG. 8 is a block diagram illustrating read and write operations of the present invention.

Referring to FIG. 8, an operation 350 is shown comprising a read portion 352 and a write portion 354. The operation 350 may illustrate how reads and writes to the snapshot volume are handled when the snapshot image is active and the rollback process is active. The read portion 352 generally-comprises a state 356, a decision state 358, a decision state 360, a decision state 362, a state 364, a state 366, a state 368 and a DONE state 370. The write side 354 generally comprises a state 372, a decision 374, a decision state 376, a decision state 378, a state 380, a state 382 and a state 384. The state 356 generally reads the snapshot volume 254. The decision state 358 may then determine if an LBA is in the data set C. If the LBA is in the data set C, the state 364 may read one or more data blocks from the data set C and proceed to the DONE state 370. If the LBA is not in the data set C, the decision state 360 may determine if the LBA is less than the rollback LBA. If the LBA is less than the rollback LBA, the state 366 may read one or more data blocks from the data set A and proceed to the DONE state 370. If the LBA is not less than the rollback LBA, the decision state 362 may determine if the LBA is in the data set B. If the LBA is in the data set B, the state 368 may read one or more data blocks from the data set B and proceeds to the DONE state 370. If the LBA is not in the data set B, the state 366 may read one or more data blocks from the data set A and proceed to the DONE state 370.

The write portion 354 generally writes to the snapshot volume 254 at the state 372. The decision state 374 may determine if an LBA is in the data set C. If the LBA is in the data set C, the state 380 may write one or more data blocks to the data set C and proceed to the DONE state 384. If the LBA is not in the data set C, the decision state 376 may determine if the LBA is less than the rollback LBA. If the LBA is less than the rollback LBA, the state 380 may write one or more data blocks to the data set C. If the LBA is not less than the rollback LBA, the decision state 378 may determine if the LBA is in the data set B. If the LBA is in the data set B, the state 382 may copy one or more data blocks from the data set B to the data set A and proceed to the state 380. If the LBA is not in the data set B, the decision state 378 may proceed to the state 380. The state 380 may proceed to the DONE state 384.

Figure 9:
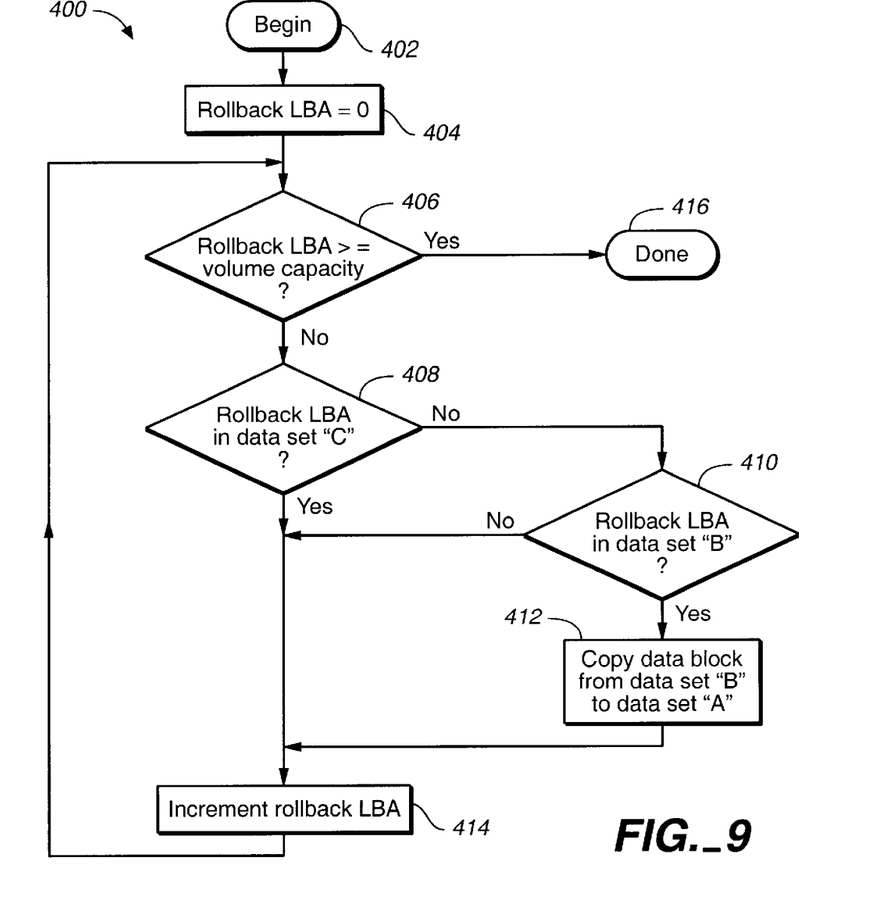
FIG. 9 is a block diagram illustrating an operation of the present invention.

Referring to FIG. 9, an operation 400 is shown. The operation 400 may illustrate the rollback operation. The operation 400 may check a newest data set first in order to determine if a prior write operation has already "rolled back" a particular LBA. The operation 400 generally comprises a state 402, a state 404, a decision state 406, a decision state 408, a decision state 410, a state 412, a state 414 and a state 416. The state 402 generally begins the operation 400 and proceeds to the state 404. The state 404 sets the rollback LBA to zero and the decision state 406 may determine if the rollback LBA is greater than or equal to the volume capacity carried. If the rollback LBA is greater than or equal to the volume capacity, the decision state 406 may move to the DONE state 416. If the rollback LBA is not greater than or equal to the volume capacity, the decision state 408 may determine if the rollback LBA is in the data set C. If the rollback LBA is in the data set C, the state 414 may increment the rollback LBA and proceed back to the decision state 406. If the rollback LBA is not in the data set C, the decision state 410 may determine if the rollback LBA is in the data set B. If the rollback LBA is in the data set B, the state 412 may copy one or more data blocks from the data set B to the data set A and proceed to the state 416. If the rollback LBA is not in the data set B, the decision state 410 may move directly to the state 414.

Figure 10:
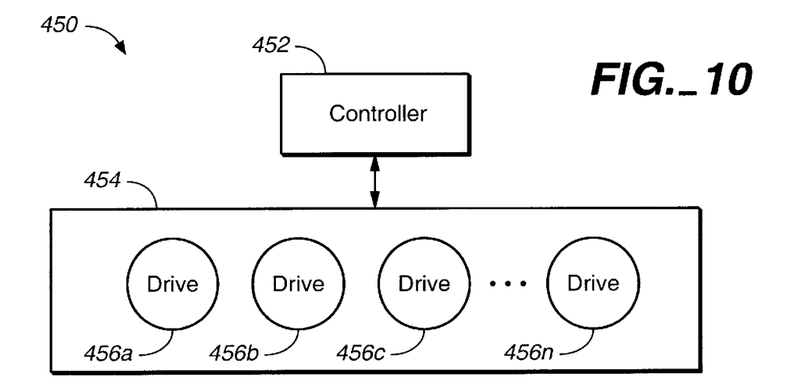
FIG. 10 is a block diagram illustrating an example implementation of the present invention.

Referring to FIG. 10, a block diagram of a circuit (or system) 450 is shown implementing a multiple drive implementation of the present invention. The system 450 generally comprises a controller 452 and an array block 454. The controller 452 generally controls data storage capabilities of the block array 454. The array block 454 generally comprises a number of drives 456a–456n. The array block 454 and the drives 456a–456n may implement one or more volumes. For example, the drives 456a–456n may implement a number of snapshot volumes and a number of original volumes. The controller 452 may be configured to control rollback and snapshot capabilities of the drives 456a–456n. The system 450 may provide a method and/or architecture that may implement I/O requests concurrently with a rollback process from a snapshot volume.

The function performed by the flow diagrams of FIGS. 2, 4, 5, 7, 8 and 9 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art (s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMs, RAMs, EPROMs, EEPROMs, Flash memory, magnetic or optical cards, or any type of media,suitable for storing electronic instructions.

While the invention has been particularly shown and described with reference to the preferred embodiments thereof, it will be understood by those skilled in the art that various changes in form and details may be made without departing from the spirit and scope of the invention.

What is claimed is:

1. A method for allowing I/O requests to run concurrently during a rollback process, comprising the steps of:
   (A) reading from and writing to an original volume; and
   (B) running said I/O requests concurrently with said rollback process of said original volume from a snapshot volume, wherein (i) current data in a particular data block of said original volume is newer than original data in said particular data block of said snapshot volume and (ii) said rollback process replaces said current data with said original data.

2. The method according to claim 1, wherein step (A) further comprises the step of:
   reading and writing to one or more data blocks.

3. The method according to claim 2, wherein step (A) further comprises:
   writing to said original volume in response to a logical block address.

4. The method according to claim 1, wherein step (B) further comprises:
   reading from said snapshot volume in response to a logical block address.

5. The method according to claim 1, wherein step (B) further comprises:
   reading and writing in response to a logical block address.

6. The method according to claim 5, wherein said reading and writing is further in response to a position of said logical block address.

7. A computer readable medium configured to store instructions for executing the steps of claim 1.

8. An apparatus comprising:
means for reading from and writing to a first volume; and
means for concurrently executing a rollback process of said first volume from a second volume while reading from and writing to said first volume, wherein (i) current data in a particular data block of said first volume is newer than original data in said particular data block of said second volume and (ii) said rollback process replaces said current data with said original data.

9. An apparatus comprising:
at least one drive storing a first volume and a second volume; and
a controller configured to (A) read from and write to said first volume and (B) run I/O requests concurrently during a rollback process of said first volume from said second volume, wherein (i) current data in a particular data block of said first volume is newer than original data in said particular data block of said second volume and (ii) said rollback process replaces said current data with said original data.

10. The apparatus according to claim 9, wherein said apparatus is further configured to map one or more data blocks to one or more addresses.

11. The apparatus according to claim 10, wherein each of said one or more addresses comprise a logical block address.

12. The apparatus according to claim 10, wherein each of said one or more addresses are mapped one-to-one to each of said one or more data blocks.

13. The apparatus according to claim 9, wherein said second volume comprises data copied from said first volume prior to modifying said data in said first volume.

14. The apparatus according to claim 9, wherein said second volume is configured to allow access to said first volume.

15. The apparatus according to claim 9, wherein said at least one driver further stores a third volume configured to allow access to said first volume.

16. The apparatus according to claim 15, wherein said second volume comprises a first data set comprising current data and a second data set comprising modifications of said current data.

17. The apparatus according to claim 16, wherein said third volume further comprises a third data set, wherein said first and said second data sets comprise current data and said third data set comprises modifications to said current data.

18. The apparatus according to claim 9, where in said controller is further configured to create a snapshot image of said first volume.

19. The apparatus according to claim 9, wherein said controller is further configured to allow efficient accessability to said first volume during said rollback process.

20. The apparatus according to claim 9, wherein said controller is further configured to allow one or more snapshot images to be created during said rollback process.

* * * * *